United States Patent [19]
Saegusa et al.

[11] Patent Number: 4,540,747
[45] Date of Patent: Sep. 10, 1985

[54] BLOCK COPOLYMER

[75] Inventors: Takeo Saegusa, 8-22, Tojiin Kitamachi, Kita-ku, Kyoto; Shiro Kobayashi, Kyoto; Yasuhiro Moriuchi, Niihama, all of Japan

[73] Assignees: Sumitomo Chemical Company, Limited, Osaka; Takeo Saegusa, Kyoto, both of Japan

[21] Appl. No.: 615,096

[22] Filed: May 29, 1984

[30] Foreign Application Priority Data

Jun. 10, 1983 [JP] Japan ................... 58-104753
Jun. 10, 1983 [JP] Japan ................... 58-104754

[51] Int. Cl.$^3$ ............................................. C08L 79/04
[52] U.S. Cl. ................................... 525/410; 252/357; 524/538; 528/403
[58] Field of Search ............... 525/410; 524/447, 538; 528/403; 252/357

[56] References Cited

U.S. PATENT DOCUMENTS

| 3,373,194 | 3/1968 | Fuhrmann et al. | 328/403 |
| 3,516,944 | 6/1970 | Litt et al. | 252/316 |
| 4,104,228 | 8/1978 | Meyer et al. | 525/410 |
| 4,186,191 | 1/1980 | Chamberlin et al. | 525/410 |
| 4,261,925 | 4/1981 | Tomalin et al. | 564/94 |
| 4,436,789 | 5/1984 | Davis et al. | 524/447 |

Primary Examiner—Allan M. Lieberman
Attorney, Agent, or Firm—Wenderoth, Lind & Ponack

[57] ABSTRACT

Block copolymers of poly(N-formylethyleneimine) or poly(N-acetylethyleneimine) with poly(N-acylethyleneimine or poly(N-acylpropyleneimine) having a molecular weight of 500 to 50,000 and a method for their production. These block copolymers are useful as surface active agents.

9 Claims, No Drawings

BLOCK COPOLYMER

The present invention relates to a block copolymer, particularly a block copolymer of poly(N-formylethyleneimine) or poly(N-acetylethyleneimine) with poly(N-acylethyleneimine) or poly(N-acylpropyleneimine). More particularly, the present invention relates to a novel block copolymer combining, in its main chain, a poly(N-formylethyleneimine) or poly(N-acetylethyleneimine) block having a hydrophilicity and a poly(N-acylethyleneimine) or poly(N-acylpropyleneimine) block having an oleophilicity, its production and surface active agents comprising it.

Hitherto, a method for carrying out the cationic ring-opening isomerization homopolymerization of, for example, 2-substituted-2-oxazolines (e.g. 2-methyl-2-oxazoline, 2-phenyl-2-oxazoline) or 2-substituted-5,6-dihydro-4H-1,3-oxazines (e.g. 2-phenyl-5,6-dihydro-4H-1,3-oxazine) (hereinafter referred to as 2-substituted-1,3-oxazine) is described, for example, in the literatures such as Polym. J., 4, 87 (1973), J. Polym. Sci. B, 5, 871 (1967), J. Polym. Sci. A-1, 4, 2253 (1966) and the like. Also, the block copolymer of 2-ethyl-2-oxazoline with 2-undecyl-2-oxazoline is described in Adv. Chem. Ser. 142, 320 (1975) and is well known.

But, the block copolymer represented by the formula (1) below having $R_2$, $R_3$ and $R_4$ groups, proper molecular weight and block ratio is not yet known.

The present invention provides a block copolymer of poly(N-formylethyleneimine) or poly(N-acetylethyleneimine) with poly(N-acylethyleneimine) or poly(N-acylpropyleneimine) having a molecular weight of 500 to 50000 represented by the following formula (1),

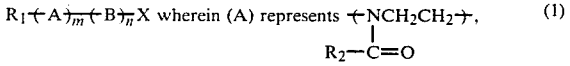

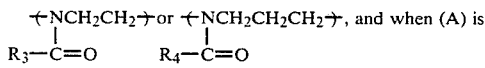

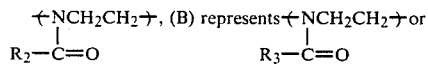

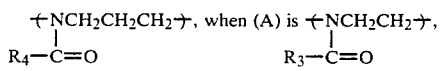

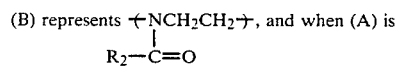

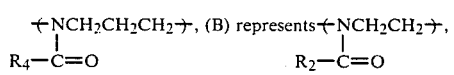

and $R_1$ represents a hydrogen atom or an alkyl or aralkyl group, $R_2$ represents a hydrogen atom or a methyl group, $R_3$ represents a $C_6$-$C_{18}$ alkyl, aralkyl or aryl group, $R_4$ represents a $C_6$-$C_{18}$ alkyl, aralkyl or aryl group, m and n represents the polymerization degrees of the respective blocks determined in connection with the molecular weight, the ratio of m:n being 0.1 to 10, and X represents a terminal group.

Also, the present invention provides a method for producing the block copolymer represented by the above formula (1). That is, the block substantially complete first-step cationic ring-opening polymerization of a 2-oxazoline compound represented by the formula (2),

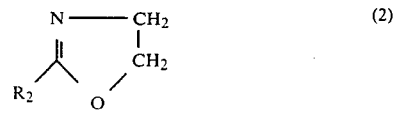

wherein $R_2$ is as defined above,
or a 2-oxazoline compound represented by the formula (3),

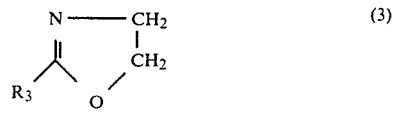

wherein $R_3$ is as defined above,
or a 2-substituted-1,3-oxazine compound represented by the formula (4),

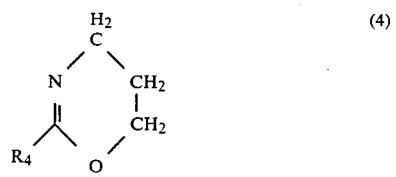

wherein $R_4$ is as defined above, is carried out, and then when said first-step cationic ring-opening polymerization is the polymerization of the compound represented by the formula (2), the second-step cationic ring-opening polymerization of the compound represented by the formula (3) or (4) is carried out, or when said first-step cationic ring-opening polymerization is the polymerization of the compound represented by the formula (3), the second-step cationic ring-opening polymerization of the compound represented by the formula (2) is carried out, or when said first-step cationic ring-opening polymerization is the polymerization of the compound represented by the formula (4), the second-step cationic ring-opening polymerization of the compound represented by the formula (2) is carried out.

Also, the present invention provides surface active agents comprising the block copolymer represented by the formula (1).

Next, the present invention will be illustrated in detail.

The compound represented by the formula (2) is a monomer for forming the constitutent unit,

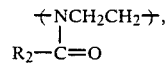

of one of the blocks, (A) and (B), of the foregoing formula (1), and its examples include 2-oxazoline and 2-methyl-2-oxazoline. These compounds can be synthesized, for example, by the method described in Liebigs Ann. Chem., 996–1009 (1974). It is not preferred that the number of carbon atoms of $R_2$ in the unit is less than 2, because the hydrophilicity of the side chain developed by $R_2$ becomes poor and besides the water-solubility of the block copolymer remarkably lowers, as a result of which the characteristics described later of the block copolymer intended by the present invention are lost.

The compound represented by the formula (3) is a monomer for forming the constituent unit,

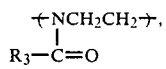

of one of the blocks, (A) and (B), of the foregoing formula (1), and its examples include 2-hexyl-2-oxazoline, 2-heptyl-2-oxazoline, 2-octyl-2-oxazoline, 2-nonyl-2-oxazoline, 2-decyl-2-oxoazoline, 2-undecyl-2-oxazoline, 2-dodecyl-2-oxazoline, 2-tridecyl-2-oxazoline, 2-tetradecyl-2-oxazoline, 2-pentadecyl-2-oxazoline, 2-hexadecyl-2-oxazoline, 2-heptadecyl-2-oxazoline, 2-octadecyl-2-oxazoline, 2-benzyl-2-oxazoline, 2-phenyl-2-oxazoline, 2-naphthyl-2-oxazoline, 2-anthryl-2-oxazoline, 2-pyrenyl-2-oxazoline, 2-perylenyl-2-oxazoline and the like. These compounds can be produced, for example, by the method described in Liebigs Ann. Chem., 996-1009 (1974). It is not preferred that when $R_3$ in the unit is an alkyl group, the number of its carbon atoms is not more than 5, because the oleophilicity of the side chain developed by $R_3$ becomes poor resulting in loss of the characteristics described later of the block copolymer intended by the present invention.

The compound represented by the formula (4) is a monomer for forming the constituent unit,

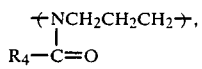

of one of the blocks, (A) and (B), of the foregoing formula (1), and its examples include 2-hexyl-1,3-oxazine, 2-heptyl-1,3-oxazine, 2-octyl-1,3-oxazine, 2-decyl-1,3-oxazine, 2-undecyl-1,3-oxazine, 2-dodecyl-1,3-oxazine, 2-tridecyl-1,3-oxazine, 2-tetradecyl-1,3-oxazine, 2-pentadecyl-1,3-oxazine, 2-hexadecyl-1,3-oxazine, 2-heptadecyl-1,3-oxazine, 2-octadecyl-1,3-oxazine, 2-benzyl-1,3-oxazine, 2-phenyl-1,3-oxazine, 2-naphthyl-1,3-oxazine, 2-anthryl-1,3-oxazine, 2-pyrenyl-1,3-oxazine, 2-perylenyl-1,3-oxazine and the like. These compounds can be produced, for example, by the method described in Liebigs Ann. Chem., 996-1009 (1974). It is not preferred that when $R_4$ in the unit is an alkyl group, the number of its carbon atoms is not more than 5, because the oleophilicity of the side chain developed by $R_4$ becomes poor resulting in loss of the characteristics described later of the block copolymer intended by the present invention.

As a method for producing the block copolymer of the present invention represented by the formula (1), there are bulk polymerization and solution polymerization. In the solution polymerization, acetonitrile, dimethylformamide, chloroform, benzonitrile, etc. may be used as a solvent. The amount of the solvent used is not particularly limited, but preferably, it is 20 to 2000 parts by weight based on 100 parts by weight of the total monomer fed.

A polymerization initiator is used for producing the block copolymer of the present invention represented by the formula (1), and as its examples, sulfuric acid esters, sulfonic acid esters, alkyl halides, Lewis acids, protonic acids, etc. are given. Specifically, there may be used dimethyl sulfate, methyl p-toluenesulfonate, ethyl p-toluenesulfonate, propyl p-toluenesulfonate, butyl p-toluenesulfonate, methyl iodide, ethyl iodide, propyl iodide, butyl iodide, methyl bromide, ethyl bromide, propyl bromide, butyl bromide, methyl chloride, ethyl chloride, propyl chloride, butyl chloride, boron trifluoride, titanium tetrachloride, antimony pentafluoride, trifluoromethanesulfonic acid, etc. From the standpoint of polymerization rate, however, methyl p-toluenesulfonate or methyl iodide is preferably used. The amount of the initiator used is determined by the molecular weight of the intended block copolymer, but generally, it is within a range of 0.1 to 25 mole% based on the monomer used in the first-step polymerization.

The block copolymer of the present invention represented by the formula (1) is produced by the following copolymerization procedure: In the case of, for example, solution polymerization, a dehydrated and purified solvent is added to a moisture-free and nitrogen-replaced polymerization reactor, and then a dehydrated and purified monomer and an initiator for the first-step polymerization are added. Thereafter, the reaction system is kept at a polymerization temperature of, preferably, 40° C. to 150° C. (both inclusive) to carry out substantially complete first-step polymerization of the monomer. A dehydrated and purified monomer for the second-step polymerization is added to the polymerization system which is then kept at a polymerization temperature of 40° to 150° C. (both inclusive). Both the first-step and second-step polymerizations are generally carried out for 1 to 40 hours. The reaction time varies with the polymerization temperature and the amount of the initiator used. After substantially complete polymerization of the monomer for the second-step polymerization, the reaction mixture is cooled and poured into a non-solvent (e.g. water, methanol, ethanol, hexane, diethyl ether, mixtures thereof) to form a precipitate. The precipitate is then purified and washed to obtain a block copolymer.

In the above copolymerization procedure for producing the block copolymer, when for example the monomers represented by the formulae (2) and (3) are used in combination, almost the same block copolymer is obtained independently of the order of addition of the monomers. In other words, the order of

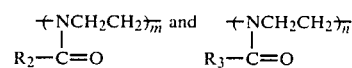

in the formula (1) is only reversed. But, the first-step polymerization of the monomer represented by the formula (2) is more preferred because the block copolymerization efficiency, which means the proportion of the objective block copolymer contained in the whole polymer produced, is high.

In the above copolymerization procedure for producing the block copolymer, the polymerization temperature employed is preferably 40° to 150° C. (both inclusive). But the polymerization rate varies with the kind of the initiator used and combination of the monomers used in the first-step and second-step polymerizations, so that optional setting of the polymerization temperature will suffice.

In the above copolymerization procedure for producing the block copolymer, the term "substantially complete polymerization" means that the polymerization yield is not less than 70%. Particularly in the first-step polymerization, it is preferred to set the polymerization yield at not less than 90% in terms of block copolymerization efficiency.

In the above copolymerization procedure for producing the block copolymer, the monomer for the second-step polymerization may be added to the system in which the first-step polymerization has been completed, either directly or after the system is once transferred to another moisture-free and nitrogen-replaced polymerization reactor. The reason for this is that polymerization activity-retaining ion pairs present at the terminals of the polymer when the first-step polymerization has been completed, are far more stable than those in anionic polymerization, having an ability to start the second-step polymerization like the so-called living polymers.

The molecular weight of the block copolymer of the present invention is 500 to 50000 (both inclusive), preferably 1000 to 10000 (both inclusive).

Control of the molecular weight of the block copolymer of the present invention can be attained by properly determining the molar ratio of the initiator to the first-step monomer. For example, when the polymerization is carried out under the conditions that the molar ratio of first-step monomer to initiator is 10, the molecular weight of first-step monomer is 100, the molecular weight of second-step monomer is 200, the molar ratio of first-step monomer to second-step monomer is 2 and the overall polymerization yield is 100%, a block copolymer having a molecular weight of about 2000, as obtained by the following calculation, can be obtained, $$10 \times 100 + 200 \times (10 \div 2) = 2000.$$

In the formula (1) of the present invention, when the ratio of m to n (m/n) is less than 0.1 or more than 10, the desired property of the block copolymer is lost. The ratio, m/n, is therefore preferably 0.1 to 10 (both inclusive), more preferably 1 to 5 (both inclusive). Particularly the more m, when (A) is

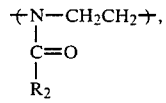

or n, when (B) is

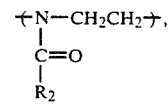

is increased, the better is the water solubility of the block copolymer of the invention.

Control of m/n can be attained by changing the molar ratio of first-step monomer to second-step monomer.

In the formula (1) of the present invention, $R_1$ and X are determined by the kind of the initiator used. For example, when the initiator is methyl p-toluenesulfonate and the first-step and second-step monomers are 2-methyl-2-oxazoline and 2-phenyl-2-oxazoline, respectively, the polymerization generally proceeds according to the well-known cationic polymerization mechanism. As a result, a block copolymer having a structure represented by the formula (4) below is produced:

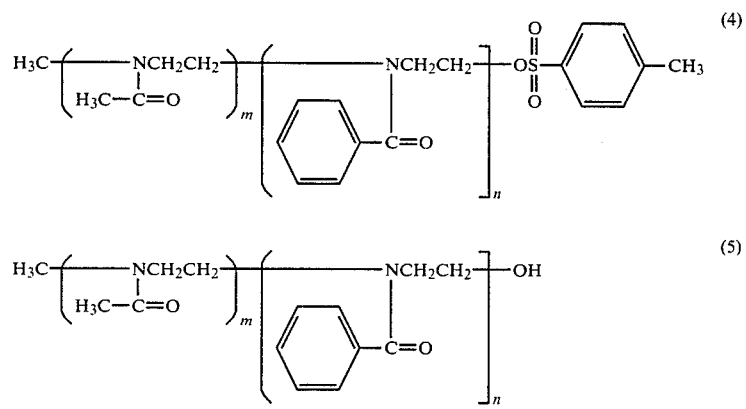

The block copolymer represented by the formula (4) is converted to a block copolymer having a structure represented by the formula (5) when hydrolyzed by the action of impurities, for example water, present in the steps of re-precipitation, purification and washing. In the case above, therefore, $R_1$ is a methyl group and X is a hydroxyl or

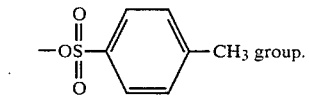 group.

Consequently, $R_1$ includes for example of a hydrogen atom and methyl, ethyl, propyl, butyl and benzyl groups, etc. and X includes for example hydroxyl,

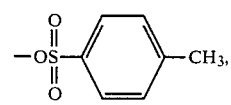

—Br and —Cl groups and

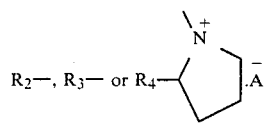

(in which A is an anion resulting from the anionic atom group of the polymerization initiator).

The block copolymer of the present invention is a white solid resin, and in its main chain, contains a block having a hydrophilic formamide unit or acetylamide unit as well as a block having an oleophilic acylamide unit. Most of the novel block copolymers of the present invention are water-soluble and useful as nonionic surface active agents, modifiers for general-purpose high molecular weight substances and anti-static agents for fibers.

Next, the present invention will be illustrated in detail with reference to the following examples.

In all the examples, the characteristics of the block copolymer, composition, molecular weight and molecular weight distribution, were determined as follows: For the composition, HITACHI R20B Proton NMR Measuring Instrument (produced by Hitachi Seisakusho Co.) (60 MHz) and deutero chloroform (solvent) were used; for the molecular weight, CORRONA 117 Vapor Pressure Osmometer (produced by Corrona Co.) and chloroform (solvent) were used, and the measurement was carried out at 40° C.; and for the molecular weight distribution, gel permeation chromatography was carried out using JASCO TRIROTOR (produced by Nippon Denshi Bunko Co.) under the following condition: a column, Shodex A803 (produced by Showa Denko Co.); solvent, chloroform; and flow amount of solvent, 1 ml/min.

EXAMPLES 1 TO 3 AND COMPARATIVE EXAMPLE 1

A 1-liter three-necked autoclave equipped with a thermometer and a stirrer was kept under a vacuum of 1 mmHg for 30 minutes and then filled with nitrogen gas. Thereafter, 500 cc of acetonitrile and 132.8 g (1.56 moles) of 2-methyl-2-oxazoline were added to the autoclave at room temperature under a nitrogen gas stream. Stirring was started and 60.1 g of methyl p-toluenesulfonate (20.7 mole% based on 2-methyl-2-oxazoline) was added. After the autoclave was tightly closed, the temperature of the system was raised in an oil bath, and polymerization was carried out at 80° C. for 15 hours. Thereafter, the system was cooled to room temperature.

Separately from this, three 300-cc three-necked autoclaves equipped with a thermometer and a stirrer were kept under a vacuum of 1 mmHg for 30 minutes and then filled with nitrogen gas. To these autoclaves was added the polymerization solution produced as above in amounts of 131.4 g, 149.1 g and 146.6 g, respectively. The rest of the polymerization solution, 152.8 g, was re-precipitated with 4 liters of a dehydrated and purified diethyl ether, and the polymer obtained was washed once with a dehydrated and purified diethyl ether and vacuum-dried at 60° C. for 48 hours.

To the foregoing three 300-cc three-necked autoclaves containing the polymerization solution was added 2-phenyl-2-oxazoline in amounts of 53.7 g, 116.5 g and 185.2 g, respectively, with stirring and under a nitrogen gas stream. After every autoclave was tightly closed, temperature-increase was started, and polymerization was carried out at 100° C. for 15 hours. Thereafter, the system was cooled to room temperature. Every polymerization solution was re-precipitated with 4 liters of a dehydrated and purified diethyl ether, and the polymer obtained was washed once with a dehydrated and purified diethyl ether and vacuum-dried at 60° C. for 48 hours.

The characteristics of the four polymers thus obtained, molecular structure, composition, molecular weight and molecular weight distribution, were determined by the proton nuclear magnetic resonance methods, gel permeation chromatography and vapor pressure osmometry. The materials are shown in Table 1, and the results of measurement of the characteristics of the polymer obtained are shown in Table 2.

TABLE 1

| | First-step polymerization | | | Second step Polymerization | | | | |
|---|---|---|---|---|---|---|---|---|
| | Amount of acetonitrile (solvent) | Amount of 2-methy-2-oxazoline (1st-step monomer) | Amount of methy p-toluene sulfonate (initiator) | Amount of the 1st step polymerization solution | Number of mole unit of the 1st-step polymer contained in the 1st-step polymerization solution *2 | Amount of 2-phenyl-2-oxazoline (2nd-step monomer) | Number of mole units of the 1st step polymer number of moles of the (2nd-step monomer | Amount of the polymerization solution used for re-precipitation in Comparative example 1 |
| Comparative example 1 | 387 g | 132.8 g (1.56 mole) | 60.1 g *1 (20.7 mole %) | — | — | — | — | 152.3 g |
| Example 1 | — | — | — | 131.4 g | 0.353 | 53.7 g (0.365 mole) | 0.97 | — |
| Example 2 | — | — | — | 149.1 g | 0.402 | 116.5 g (0.793 mole) | 0.51 | — |
| Example 3 | — | — | — | 146.6 g | 0.395 | 185.2 g (1.260 mole) | 0.31 | — |

*1 Means a mole % based on 2-methyl-2-oxazoline.
*2 Obtained by calculation. Example of calculation: The total weight of the polymerization solution in the first-step polymerization is 579.9 g which is equal to the total weight of the meterials fed, so that the number of mole units for Example 1 is:

$$\frac{132.8}{579.9} \times 131.4 \div 85.1 = 0.353$$

in which the value of 85.1 means the molecular weight of 2-methyl-2-oxazoline.

TABLE 2

| Polymerization yield (%) | | Molecular weight | Composition of polymer 1st-step monomer 2nd-step monomer (molar ratio) | Molecular weight distribution | | m *3 | n *3 | Water solubility |
|---|---|---|---|---|---|---|---|---|
| | | | | Elution time at the peak (min) | Shape of molecualr weight distribution | | | |
| Comparative example 1 | 100 | 663 | — | 18.4 | Simple peak | 5.6 | 0 | Completely soluble |
| Example 1 | 98 | 1630 | 0.86 | 16.7 | Simple peak | 5.6 | 6.6 | Almost soluble |
| Example 2 | 95 | 2320 | 0.50 | 15.9 | Simple peak | 5.6 | 11.3 | Some insoluble parts |
| Example 3 | 99 | 3280 | 0.30 | 15.6 | Simple peak | 5.4 | 17.9 | Some insoluble parts |

*3 Obtained by calculation using the data of the molecular weight and composition of the polymer. Example of calculation: In the case of Example 1, the molecular weight of the poly(N—lower acylethyleneimine) part of the polymer excluding the starting terminal and stopping terminal is, 1630 − 186 = 1444. By solving the following two equations.
85.1 m + 147 n = 1444
m/n = 0.86
m = 5.6 and n = 6.6 are obtained. Hereupon, the values of 85.1 and 147 mean the molecular weights of the first-step and second-step monomers, respectively.

Each of the proton NMR spectra of the polymers obtained in Examples 1 to 3 shows the absorption of the methyl proton of the N-acetyl group at $E = 2.1$ ppm, that of the methylene proton of the ethyleneimine unit in the range of $E = 2.8$ ppm to 4 ppm, and that of the phenyl proton of the N-benzoyl group in the range of $E = 6.9$ ppm to 8 ppm. From this, it was found that every polymer has both an N-acetyl group and an N-benzoyl group. The composition of the polymer was obtained from the ratio of the absorption area of the methyl part of the N-acetyl group to that of the phenyl part of the N-benzoyl group.

From the result of gel permeation chromatography, it was found that each of the molecular weight distributions of the polymers obtained in Examples 1 to 3 has no peaks of the molecular weight distribution of the polymer obtained in Comparative example 1, forming a simple peak, and besides that is shifts nearer to the high molecular weight side than that of the polymer obtained in Comparative example 1.

The result of the vapor pressure osmometry also showed that the molecular weight of every polymer obtained in Examples 1 to 3 is larger than that of the polymer obtained in Comparative example 1, and this agreed with the result of gel permeation chromatography.

Also, it is clear that a homopolymer which may be obtained from the monomer for the second-step polymerization is not present in any of the polymers obtained in Examples 1 to 3 for the reason that the molecular weight distributions of said polymers form a simple peak. Additionally while the polymer obtained, for example, in Example 1 is soluble in water, the homopolymer obtained from the monomer for the second-step polymerization is insoluble in water.

Also, the molar ratio of the co-monomers shows a good aggrement with the composition (block ratio) of the polymer, and the values of m in Examples 1 to 3, 5.6, 5.6 and 5.4, show a very good agreement with one another. Because the same first-step polymerization solution was used in every Example, this is a matter of course, assuming that complete block copolymerization was attained. In fact, a good agreement was attained as shown above.

From the above, it is clear that the block copolymers of Examples 1 to 3 were obtained by complete block copolymerization of the polymer obtained in the first-step polymerization.

EXAMPLES 4 TO 9 AND COMPARATIVE EXAMPLES 2 AND 3

Polymerization was carried out in the same manner as in Examples 1 to 3 and Comparative example 1 except that the amount of the initiator and the molar ratio of first-step monomer to second-step monomer were changed. The materials are shown in Table 3, and the results of measurement of the characteristics of the polymer obtained are shown in Table 4. From the above, it is clear that a a block copolymer was obtained also in Examples 4 to 9 in the same manner as in Examples 1 to 3.

TABLE 3

| | First-step polymerization | | | Second step Polymerization | | | | Amount of the polymerization solution for re-precipitation in Comparative example |
|---|---|---|---|---|---|---|---|---|
| | Amount of acetonitrile (solvent) | Amount of 2-methyl-2-oxazoline (1st-step monomer) | Amount of methyl p-toluenesulfonate (initiator) | Amount of the 1st step polymerization solution | Number of mole units of the 1st-step polymer contained in the 1st-step polymerization solution | Amount of 2-phenyl-2-oxazoline (2nd-step monomer) (mole) | Number of mole units of the 1st-step polymer / number of moles of the 2nd-step monomer | |
| Comparative example 2 | 388 g | 134.5 g (1.58 mole) | 29.8 g (10.17 mole %) | — | — | — | — | 105.1 g |
| Example 4 | — | — | — | 148.8 g | 0.426 | 0.245 | 1.74 | — |
| Example 5 | — | — | — | 153.4 g | 0.439 | 0.462 | 0.95 | — |
| Example 6 | — | — | — | 145.0 g | 0.415 | 0.690 | 0.60 | — |
| Comparative example 3 | 395 g | 130.9 g (1.54 mole) | 20.3 g (7.12 mole %) | — | — | — | — | 91.5 g |

TABLE 3-continued

| | First-step polymerization | | | Second step Polymerization | | | | |
|---|---|---|---|---|---|---|---|---|
| | Amount of acetonitrile (solvent) | Amount of 2-methyl-2-oxazoline (1st-step monomer) | Amount of methyl p-toluene-sulfonate (initiator) | Amount of the 1st step polymerization solution | Number of mole units of the 1st-step polymer contained in the 1st-step polymerization solution | Amount of 2-phenyl-2-oxazoline (2nd-step monomer) (mole) | Number of mole units of the 1st-step polymer / number of moles of the 2nd-step monomer | Amount of the polymerization solution for re-precipitation in Comparative example |
| Example 7 | — | — | — | 153.3 g | 0.432 | 0.145 | 2.98 | — |
| Example 8 | — | — | — | 151.1 g | 0.426 | 0.279 | 1.53 | — |
| Example 9 | — | — | — | 150.3 g | 0.423 | 0.425 | 1.00 | — |

TABLE 4

| | Polymerization yield (%) | Molecular weight | Composition of polymer 1st-step monomer / 2nd-step monomer (molar ratio) | Molecular weight distribution | | | | Water-solubility |
|---|---|---|---|---|---|---|---|---|
| | | | | Elution time at the peak (min) | Shape of molecular weight distribution | m | n | |
| Comparative example 2 | 100 | 1200 | — | 17.7 | Simple peak | 11.9 | 0 | Completely soluble |
| Example 4 | 100 | 2400 | 1.66 | 16.2 | Simple peak | 12.7 | 7.7 | Completely soluble |
| Example 5 | 98 | 3150 | 0.96 | 15.8 | Simple peak | 12.4 | 13.0 | Completely soluble |
| Example 6 | 99 | 3900 | 0.64 | 15.2 | Simple peak | 11.8 | 18.4 | Some insoluble parts |
| Comparative example 3 | 100 | 1700 | — | 17.0 | Simple peak | 17.8 | 0 | Completely soluble |
| Example 7 | 100 | 2390 | 3.09 | 16.0 | Simple peak | 16.6 | 5.4 | Completely soluble |
| Example 8 | 99 | 3210 | 1.53 | 15.7 | Simple peak | 16.7 | 10.9 | Completely soluble |
| Example 9 | 100 | 3740 | 0.98 | 15.1 | Simple peak | 15.1 | 15.4 | Completely soluble |

EXAMPLES 10 AND 11 AND COMPARATIVE EXAMPLE 4

The methods of feed, polymerization and polymer treatment were carried out in the same manner as in Examples 1 to 3 and Comparative example 1 except that 2-methyl-2-oxazoline and 2-dodecyl-2-oxazoline were used in combination as the first-step and second-step monomers, respectively. The characteristics of the polymer obtained were also measured in the same manner as in Examples 1 to 3 and Comparative example 1. The materials are shown in Table 5, and the results of measurement of the characteristics of the polymer obtained are shown in Table 6. From the above results, it is clear that a block copolymer was obtained also in Examples 10 and 11 in the same manner as in Examples 1 to 3.

TABLE 5

| | First-step polymerization | | | Second step polymerization | | | | |
|---|---|---|---|---|---|---|---|---|
| | Amount of acetonitrile (solvent) | Amount of 2-methyl-2-oxazoline (1st-step monomer) | Amount of methyl p-toluene-sulfonate (initiator) | Amount of the 1st-step polymerization solution | Number of mole units of the 1st-step polymer contained in the 1st-step polymerization solution | Amount of 2-dodecyl-2-oxazoline (2nd-step monomer) (mole) | Number of mole units of the 1st-step polymer/ number of moles of the 2nd-step monomer | Amount of the polymerization solution used for re-precipitation in Comparative example |
| Comparative example 4 | 528 g | 180.0 g (2.11 mole) | 36.5 g (9.29 mole %) | — | — | — | — | 157.2 g |
| Example 10 | — | — | — | 136.1 g | 0.386 | 0.173 | 2.23 | — |
| Example 11 | — | — | — | 141.2 g | 0.401 | 0.358 | 1.12 | — |

TABLE 6

| | Polymerization yield (%) | Molecular weight | Composition of polymer 1st-step monomer / 2nd-step monomer (molar ratio) | Molecular weight distribution | | | | Water-solubility |
|---|---|---|---|---|---|---|---|---|
| | | | | Elution time at the peak (min) | Shape of molecular weight distribution | m | n | |
| Comparative example 4 | 96 | 1340 | — | 17.5 | Simple peak | 13.5 | 0 | Completely soluble |
| Example 10 | 93 | 2240 | 2.36 | 15.7 | Simple peak | 11.0 | 4.7 | Completely soluble |

TABLE 6-continued

| | Polymerization yield (%) | Molecular weight | Composition of polymer 1st-step monomer 2nd-step monomer (molar ratio) | Molecular weight distribution | | | | Water-solubility |
| --- | --- | --- | --- | --- | --- | --- | --- | --- |
| | | | | Elution time at the peak (min) | Shape of molecular weight distribution | m | n | |
| Example 11 | 88 | 3120 | 1.21 | 15.1 | Simple peak | 10.4 | 8.5 | Some insoluble parts |

EXAMPLE 12

Among the polymers obtained in Examples 1 to 11 and Comparative examples 1 to 4, those which were completely soluble in water were each dissolved in water to prepare a 1 wt.% aqueous solution, and the surface tension of the aqueous solution was measured by means of Du Noüy tensiometer. The results are shown in Table 7.

TABLE 7

| | Comparative example 1 | Example 1 | Comparative example 2 | Example 4 | Example 5 | Comparative example 3 | Example 7 | Example 8 | Example 9 | Comparative example 4 | Example 10 | Ion-exchange water |
| --- | --- | --- | --- | --- | --- | --- | --- | --- | --- | --- | --- | --- |
| Surface tension (dyne/cm) | 72.3 | 58.7 | 58.6 | 46.7 | 43.4 | 55.3 | 50.6 | 44.1 | 46.6 | 62.3 | 36.5 | 74.0 |

As shown above, the aqueous solution of the polymer of every Example shows a low surface tension, being useful as a surface active agent, while the aqueous solutions of the polymers of the corresponding Comparative examples show a relatively high surface tension.

EXAMPLES 13 AND 14 AND COMPARATIVE EXAMPLE 5

A 1-liter three-necked autoclave equipped with a thermometer and a stirrer was kept under a vacuum of 1 mmHg for 30 minutes and then filled with nitrogen gas. Thereafter, 670 cc of acetonitrile and 179.9 g (2.11 mole) of 2-methyl-2-oxazoline were added to the autoclave at room temperature under a nitrogen gas stream. Stirring was started and 36.5 g of methyl p-toluenesulfonate (9.3 mole% based on 2-methyl-2-oxazoline) was added. After the autoclave was tightly closed, the temperature of the system was raised in an oil bath, and polymerization was carried out at 80° C. for 15 hours. Thereafter, the system was cooled to room temperature.

Separately from this, two 300 cc three-necked autoclaves equipped with a thermometer and a stirrer were kept under a vacuum of 1 mmHg for 30 minutes and then filled with nitrogen gas. To these autoclaves was added the polymerization solution produced as above in amounts of 140.1 g and 141.0 g, respectively. The rest of the polymerization solution, 157.2 g, was re-precipitated with 4 liters of a dehydrated and purified diethyl ether, and the polymer obtained was washed once with a dehydrated and purified diethyl ether and vacuum-dried at 60° C. for 48 hours.

To the foregoing two 300 cc three-necked autoclaves containing the polymerization solution was added 2-phenyl-1,3-oxazine in amounts of 39.5 g and 71.1 g, respectively, with stirring and under a nitrogen gas stream. After every autoclave was tightly closed, temperature-increase was started, and polymerization was carried out at 100° C. for 40 hours. Thereafter, the system was cooled to room temperature. Every polymerization solution was re-precipitated with 4 liters of a dehydrated and purified diethyl ether, and the polymer obtained was washed once with a dehydrated and purified diethyl ether and vacuum-dried at 60° C. for 48 hours.

The characteristics of the three polymers thus obtained, molecular structure, composition, molecular weight and molecular weight distribution, were determined by the proton nuclear magnetic resonance method, gel permeation chromatography and vapor pressure osmometry. The materials are shown in Table 8, and the results of measurement of the characteristics of the polymer obtained are shown in Table 9.

TABLE 8

| | First-step polymerization | | | Second step Polymerization | | | | Amount of the polymerization solution used for re-precipitation in Comparative example 5 |
| --- | --- | --- | --- | --- | --- | --- | --- | --- |
| | Amount of acetonitrile (solvent) | Amount of 2-methyl-2-oxazoline (1st-step monomer) | Amount of methy p-toluene sulfonate (initiator) | Amount of the 1st step polymerization solution | Number of mole units of the 1st-step polymer contained in the 1st-step polymerization solution *2 | Amount of 2-phenyl-2-oxazoline (2nd-step monomer) | Number of mole units of the 1st-step polymer number of moles of the 2nd-step monomer | |
| Comparative example 5 | 527 g | 179.9 g (2.11 mole) | 36.5 g*1 (9.3 mole %) | — | — | — | — | 157.2 g |
| Example 13 | — | — | — | 140.1 g | 0.398 | 39.5 g (0.245 mole) | 1.62 | — |
| Example 14 | — | — | — | 141.0 g | 0.400 | 71.1 g | 0.90 | — |

TABLE 8-continued

| | First-step polymerization | | | Second step Polymerization | | | |
|---|---|---|---|---|---|---|---|
| | | | | Number of mole | | Number of mole units of the 1st-step | Amount of the |
| | Amount of | Amount of | Amount of | units of the 1st- | Amount of | polymer | polymerization |
| Amount | 2-methy- | methy p- | the 1st step | step polymer con- | 2-phenyl- | number of | solution used for |
| of aceto- | 2-oxazoline | toluene | poly- | tained in the 1st- | 2-oxazoline | moles of the | re-precipitation |
| nitrile | (1st-step | sulfonate | merization | step polymeriza- | (2nd-step | 2nd-step | in Comparative |
| (solvent) | monomer) | (initiator) | solution | tion solution *2 | monomer) | monomer | example 5 |
| | | | | (0.442 mole) | | | |

*1 Means a mole % based on 2-methyl-2-oxazoline.
*2 Obtained by calculation. Example of calculation: The total weight of the polymerization solution in the first-step polymerization is 743.4 g which is equal to the total weight of the materials fed, so that the number of mole units for example 13 is:

$$\frac{179.9}{743.4} \times 140.1 \div 85.1 = 0.398$$

in which the value of 85.1 means the molecular weight of 2-methyl-2-oxazoline.

TABLE 9

| | | | Composition of polymer 1st-step monomer | Molecular weight distribution | | | | |
|---|---|---|---|---|---|---|---|---|
| | Polymeri-zation yield (%) | Molecular weight | 2nd-step monomer (molar ratio) | Elution time at the peak (min) | Shape of molecular weight dis-tribution | m 3* | n 3* | Water-solubility |
| Comparative example 5 | 96 | 1340 | — | 17.5 | Simple peak | 13.5 | — | Completely soluble |
| Example 13 | 96 | 2430 | 1.53 | 15.6 | Simple peak | 11.8 | 7.7 | Completely soluble |
| Example 14 | 98 | 3210 | 0.85 | 14.9 | Simple peak | 11.0 | 12.9 | Almost soluble |

*3 Obtained by calculation using the data of the molecular weight and composition of the polymer. Example of calculation: In the case of Example 13, the molecular weight of the poly(N—acylalkyleneimine) part of the polymer excluding the starting terminal and stopping terminal is, 2430 − 186 = 2244. By solving the following two equations,
85.1 m + 161 n = 2244
m/n = 1.53
m = 11.8 and n = 7.7 are obtained. Hereupon, the values of 85.1 and 161 mean the molecular weights of the first-step and second-step monomers, respectively.

Each of the proton NMR spectra of the polymers obtained in Examples 13 and 14 shows the absorption of the methyl proton of the N-acetyl group at δ=2.1 ppm, that of the methylene proton of the alkyleneimine unit in the range of δ=2.8 ppm to 4 ppm, and that of the phenyl proton of the N-benzoyl group in the range of δ=6.9 ppm to 8 ppm. From this, it was found that every polymer has both an N-acetyl group and an N-benzoyl group. The composition of the polymer was obtained from the ratio of the absorption area of the methyl part of the N-acetyl group to that of the phenyl part of the N-benzoyl group.

From the result of gel permeation chromatography, it was found that each of the molecular weight distributions of the polymers obtained in Examples 13 and 14 has no peaks of the molecular weight distribution of the polymer obtained in Comparative example 5, forming a simple peak, and besides that it shifts nearer to the high molecular weight side than that of the polymer obtained in Comparative example 5.

The result of the vapor pressure osmometry also showed that the molecular weight of every polymer obtained in Examples 13 and 14 is larger than that of the polymer obtained in Comparative example 5, and this agreed with the result of gel permeation chromatography.

Also, it is clear that a homopolymer which may be obtained from the monomer for the second-step polymerization is not present in any of the polymers obtained in Examples 13 and 14 for the reason that the molecular weight distributions of the polymers form a simple peak. Additionally while the polymer obtained, for example, in Example 13 is soluble in water, the homopolymer obtained from the monomer for the second-step polymerization is insoluble in water.

Also, the molar ratio of the co-monomers shows a good agreement with the composition (block ratio) of the polymer, and the values of m in Examples 13 and 14, 11.8 and 11.0, show a very good agreement with one another. Because the same first-step polymerization solution was used in every Example, this is a matter of course, assuming that complete block copolymerization was attained. In fact, a good agreement was attained as shown above.

From the above, it is clear that the block copolymers of Examples 13 and 14 were obtained by complete block copolymerization of the polymer obtained in the first-step polymerization.

EXAMPLES 15 TO 18 AND COMPARATIVE EXAMPLES 6 AND 7

Polymerization was carried out in the same manner as in Examples 13 and 14 and Comparative example 5 except that the amount of the initiator and the molar ratio of first-step monomer to second-step monomer were changed. The materials are shown in Table 10, and the results of measurement of the characteristics of the polymer obtained are shownn in Table 11. From these data, it is clear that a block copolymer was obtained also in Examples 15 to 18 in the same manner as in Examples 13 and 14.

TABLE 10

| | First-step polymerization | | | Second step polymerization | | | | Amount of the polymerization solution used for re-precipitation in Comparative example |
|---|---|---|---|---|---|---|---|---|
| | Amount of aceto-nitrile (solvent) | Amount of 2-methyl-2-oxazoline (1st-step monomer) | Amount of methyl p-toluene-sulfonate (initiator) | Amount of the 1st-step polymer-ization solution | Number of mole units of the 1st-step polymer contained in the 1st-step polymeriza-tion solution | Amount of 2-phenyl-1,3-oxazine (2nd-step monomer) (mole) | Number of mole units of the 1st-step polymer/ number of moles of the 2nd-step monomer | |
| Comparative example 6 | 391 g | 133.2 g (1.57 mole) | 59.2 g (20.3 mole %) | — | — | — | — | 147.3 g |
| Example 15 | — | — | — | 149.0 g | 0.400 | 0.391 | 1.02 | — |
| Example 16 | — | — | — | 150.3 g | 0.403 | 0.769 | 0.52 | — |
| Comparative example 7 | 393 g | 131.1 g (1.54 mole) | 19.1 g (6.67 mole %) | — | — | — | — | 149.1 g |
| Example 17 | — | — | — | 148.4 g | 0.421 | 0.138 | 3.05 | — |
| Example 18 | — | — | — | 152.2 g | 0.432 | 0.209 | 2.07 | — |

TABLE 11

| | Polymeri-zation yield (%) | Molecular weight | Composition of polymer 1st-step monomer 2nd-step monomer (molar ratio) | Molecular weight distribution | | m | n | Water-solubility |
|---|---|---|---|---|---|---|---|---|
| | | | | Elution time at the peak (min) | Shape of molecular weight dis-tribution | | | |
| Comparative example 6 | 99 | 880 | — | 18.4 | Simple peak | 7.1 | 0 | Completely soluble |
| Example 15 | 98 | 1710 | 1.10 | 16.6 | Simple peak | 6.6 | 6.0 | Completely soluble |
| Example 16 | 98 | 2750 | 0.50 | 15.8 | Simple peak | 6.3 | 12.6 | Some insoluble parts |
| Comparative example 7 | 99 | 1750 | — | 17.1 | Simple peak | 16.3 | 0 | Completely soluble |
| Example 17 | 96 | 2400 | 3.11 | 15.9 | Simple peak | 16.5 | 5.3 | Completely soluble |
| Example 18 | 98 | 2750 | 2.20 | 15.7 | Simple peak | 16.1 | 7.3 | Completely soluble |

EXAMPLES 19 AND 20 AND COMPARATIVE EXAMPLE 8

The methods of feed, polymerization and polymer treatment were carried out in the same manner as in Examples 13 and 14 and Comparative example 5 except that 2-methyl-2-oxazoline and 2-dodecyl-1,3-oxazine were used in combination as the first-step and second-step monomers, respectively. The characteristics of the polymer obtained were also measured in the same manner as in Examples 13 and 14 and Comparative example 5. The materials are shown in Table 12, and the results of measurement of the characteristics of the polymer obtained are shown in Table 13. From the above results, it is clear that a block copolymer was obtained also in Examples 19 and 20 in the same manner as in Examples 13 and 14.

TABLE 12

| | First-step polymerization | | | Second step polymerization | | | | Amount of the polymerization solution used for re-precipitation in Comparative example |
|---|---|---|---|---|---|---|---|---|
| | Amount of aceto-nitrile (solvent) | Amount of 2-methyl-2-oxazoline (1st-step monomer) | Amount of methyl p-toluene-sulfonate (initiator) | Amount of the 1st-step polymer-ization solution | Number of mole units of the 1st-step polymer contained in the 1st-step polymeriza-tion solution | Amount of 2-dodecyl-1,3-oxa-zine (2nd-step mono-mer) (mole) | Number of mole units of the 1st-step polymer/ number of moles of the 2nd-step monomer | |
| Comparative example 8 | 395 g | 132.1 g (1.55 mole) | 38.1 g (13.2 mole %) | — | — | — | — | 149.8 g |
| Example 19 | — | — | — | 137.7 g | 0.378 | 0.192 | 1.97 | — |
| Example 20 | — | — | — | 138.9 g | 0.381 | 0.377 | 1.01 | — |

TABLE 13

| | Polymeri-zation yield (%) | Molecular weight | Composition of polymer 1st-step monomer 2nd-step monomer (molar ratio) | Molecular weight distribution | | m | n | Water-solubility |
|---|---|---|---|---|---|---|---|---|
| | | | | Elution time at the peak (min) | Shape of molecular weight dis-tribution | | | |
| Comparative example 8 | 99 | 1210 | — | 17.7 | Simple peak | 13.5 | 0 | Completely soluble |
| Example 19 | 92 | 2470 | 2.04 | 15.5 | Simple peak | 10.9 | 5.3 | Completely |

TABLE 13-continued

| | Polymerization yield (%) | Molecular weight | Composition of polymer 1st-step monomer 2nd-step monomer (molar ratio) | Molecular weight distribution Elution time at the peak (min) | Shape of molecular weight distribution | m | n | Water-solubility |
|---|---|---|---|---|---|---|---|---|
| Example 20 | 89 | 3500 | 1.11 | 15.0 | Simple peak | 10.6 | 9.5 | soluble Some insoluble parts |

EXAMPLE 21

Among the polymers obtained in Examples 13 to 20 and Comparative examples 5 to 8, those which were completely soluble in water were each dissolved in water to prepare a 1 wt.% aqueous solution, and the surface tension of the aqueous solution was measured by means of Du Noüy tensiometer. The results are shown in Table 14.

TABLE 14

| | Comparative example 5 | Example 13 | Comparative example 6 | Example 15 | Compararative example 7 | Example 17 | Example 18 | Comparative example 8 | Example 19 |
|---|---|---|---|---|---|---|---|---|---|
| Surface tension (dyne/cm) | 58.1 | 45.2 | 71.5 | 52.4 | 55.0 | 44.4 | 44.1 | 57.7 | 31.5 |

As shown above, the aqueous solution of the polymer of every Example shows a low surface tension, being useful as a surface active agent, while the aqueous solutions of the polymers of the corresponding Comparative examples show a relatively high surface tension.

What is claimed is:

1. A block copolymer of poly(N-formylethyleneimine) or poly(N-acetylethyleneimine) with poly(N-acylethyleneimine) or poly(N-acylpropyleneimine) having a molecular weight of 500 to 50,000 represented by the formula

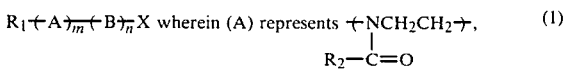 (1)

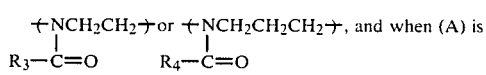

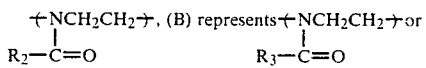

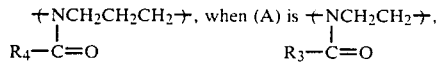

(B) represents $+NCH_2CH_2+$, and when (A) is
$R_2-C=O$ (as subscript group)

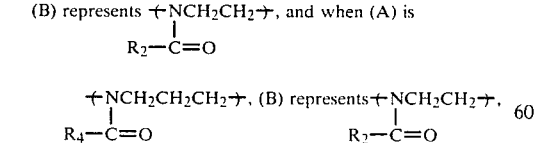

and $R_1$ represents a hydrogen atom or an alkyl or aralkyl group, $R_2$ represents a hydrogen atom or a methyl group, $R_3$ represents a $C_6-C_{18}$ alkyl, aralkyl or aryl group, $R_4$ represents a $C_6-C_{18}$ alkyl, aralkyl or aryl group, m and n represent the polymerization degrees of the respective blocks determined in connection with the molecular weight, the ratio of m:n being 0.1 to 10, and X represents a terminal group.

2. A block copolymer as described in claim 1, wherein $R_1$ is a methyl group, $R_2$ is a methyl group and $R_3$ is a phenyl group.

3. A block copolymer as described in claim 1, wherein $R_1$ is a methyl group, $R_2$ is a methyl group and $R_3$ is a dodecyl group.

4. A block copolymer as described in claim 1, wherein $R_1$ is a methyl group, $R_2$ is a methyl group and $R_4$ is a phenyl group.

5. A block copolymer as described in claim 1, wherein the ratio of m to n is 1:5.

6. A block copolymer as described in claim 1 having a molecular weight of 1,000 to 10,000.

7. A method for producing a water-soluble block copolymer of poly(N-formylethyleneimine) or poly(N-acetylethyleneimine) with poly(N-acylethyleneimine) or poly(N-acylpropyleneimine) having a molecular weight of 500 to 50,000 represented by the formula

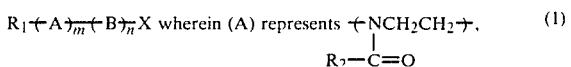 (1)

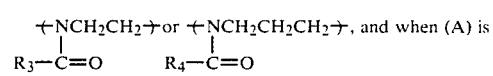

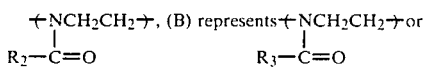

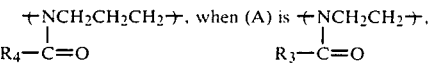

(B) represents $+NCH_2CH_2+$, and when (A) is
$R_2-C=O$

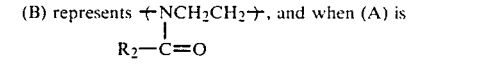

and $R_1$ represents a hydrogen atom or an alkyl or aralkyl group, $R_2$ represents a hydrogen atom or a methyl group, $R_3$ represents a $C_6-C_{18}$ alkyl, aralkyl or aryl group, $R_4$ represents a $C_6-C_{18}$ alkyl, aralkyl or acyl group, m and n represent the polymerization degrees of the respective blocks determined in connection with the molecular weight, the ratio of m:n being 0.1 to 10, and X represents a terminal group.

which comprises conducting, at a temperature of 40° to 150° C. and in the presence of a polymerization initiator selected from the group consisting of sulfuric acid esters, sulfonic acid esters, alkyl halides, Lewis acids and protonic acids, the substantially complete first-step cationic ring-opening polymerization of a 2-oxazoline compound of the formula

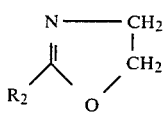 (2)

wherein $R_2$ represents a hydrogen atom or a methyl group, or a 2-oxazoline compound of the formula

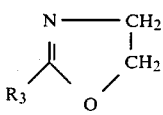 (3)

wherein $R_3$ represents a $C_6$–$C_{18}$ alkyl, aralkyl or aryl group, or a 2-substituted-5,6-dihydro-4H-1,3-oxazine compound of the formula

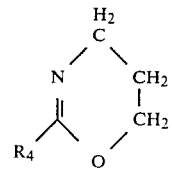 (4)

wherein $R_4$ represents a $C_6$–$C_{18}$ alkyl, aralkyl or aryl group, the amount of the initiator being 0.1 to 25 mole% based on the compound (2), (3) or (4), and then when said first-step cationic ring-opening polymerization is the polymerization of the compound (2), conducting the second-step cationic ring-opening polymerization of the compound (3) or (4) at a temperature of 40° to 150° C.; or when said first-step cationic ring-opening polymerization is the polymerization of the compound (3) or (4), conducting the second-step cationic ring-opening polymerization of the compound (2) at a temperature of 40° to 150° C.

8. A method as described in claim 7, wherein the initiator is selected from the group consisting of methyl p-toluenesulfonate and methyl iodide.

9. A surface active agent comprising: the block copolymer represented by formula (1) according to claim 1, wherein when (A) is

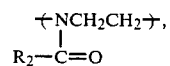

m is equal to or larger than n, or when (B) is

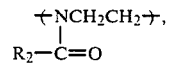

m is equal to or smaller than n, and a carrier therefor.

* * * * *